United States Patent [19]

Cognolato et al.

[11] Patent Number: 5,131,936
[45] Date of Patent: Jul. 21, 1992

[54] APPARATUS FOR MANUFACTURE OF A SILICA OPTICAL FIBER

[75] Inventors: Livio Cognolato, Baldissero Torinese; Giuseppe Parisi, Turin, both of Italy

[73] Assignee: Societa Italiana Per l'Esercizio Delle Telecomunicazioni P.A., Turin, Italy

[21] Appl. No.: 564,285

[22] Filed: Aug. 7, 1990

Related U.S. Application Data

[63] Continuation-in-part of Ser. No. 363,212, Jun. 8, 1989, abandoned.

[30] Foreign Application Priority Data

Jun. 27, 1988 [IT] Italy .................. 67605 A/88

[51] Int. Cl.$^5$ .................. C03B 19/06
[52] U.S. Cl. .................. 65/144; 65/1; 65/3.12; 65/157; 118/730
[58] Field of Search .................. 65/1, 3.12, 3.31, 11, 65/13, 60.1, 12, 144, 157; 118/715, 719, 720, 730

[56] References Cited

U.S. PATENT DOCUMENTS

| | | | |
|---|---|---|---|
| 4,067,709 | 1/1978 | Stanton | 65/3.12 |
| 4,304,581 | 12/1981 | Saifi | 65/3.12 |
| 4,310,340 | 1/1982 | Sarkar | 65/144 |
| 4,311,501 | 1/1982 | Fort et al. | 65/144 |
| 4,328,018 | 5/1982 | Siegfried | 65/144 |
| 4,334,903 | 6/1982 | MacChesney et al. | 65/3.12 |
| 4,596,589 | 6/1986 | Perry | 65/3.12 |
| 4,728,350 | 3/1988 | Cocito | 65/3.12 |
| 4,738,873 | 4/1988 | Roba et al. | 65/3.12 |
| 4,799,946 | 1/1989 | Ainslie et al. | 65/3.12 |
| 4,813,989 | 3/1989 | Uchiyama et al. | 65/1 |

FOREIGN PATENT DOCUMENTS

| | | | |
|---|---|---|---|
| 8607347 | 12/1986 | European Pat. Off. | 65/3.12 |
| 2732615 | 2/1979 | Fed. Rep. of Germany | 65/3.12 |
| 0015090 | 4/1984 | Japan | 65/3.12 |

Primary Examiner—Kenneth M. Schor
Assistant Examiner—John J. Bruckner
Attorney, Agent, or Firm—Herbert Dubno; Andrew Wilford

[57] ABSTRACT

An article for use in producing silica optical fibers doped with a metal oxide obtained by synthesis from low pressure vapor reactants is made from an outer supporting tube extending along a longitudinal axis and having first and second longitudinally opposite ends and an inner surface on which silica and a dopant formed by a reaction between vapor-state reactants can be deposited over a longitudinally extending silica-deposition zone. Respective first and second joints engage the ends of the supporting tube and each have a fixed part and a rotating part. Each rotating part supports the respective end for rotation relative to the respective fixed part about the axis. At least one of the reactants is introduced into the supporting tube through the first joint and depleted gases are discharged through the second joint. An inner tube extends through one of the joints into the outer tube and is formed between the outer-tube ends with a radially throughgoing and axially extending slit in which is held a high-purity wool of wires of metal. The inner tube is supplied internally with a gaseous compound reactive with the metal wool to form the oxide and forming a compound therewith constituting one of the reactants.

5 Claims, 1 Drawing Sheet

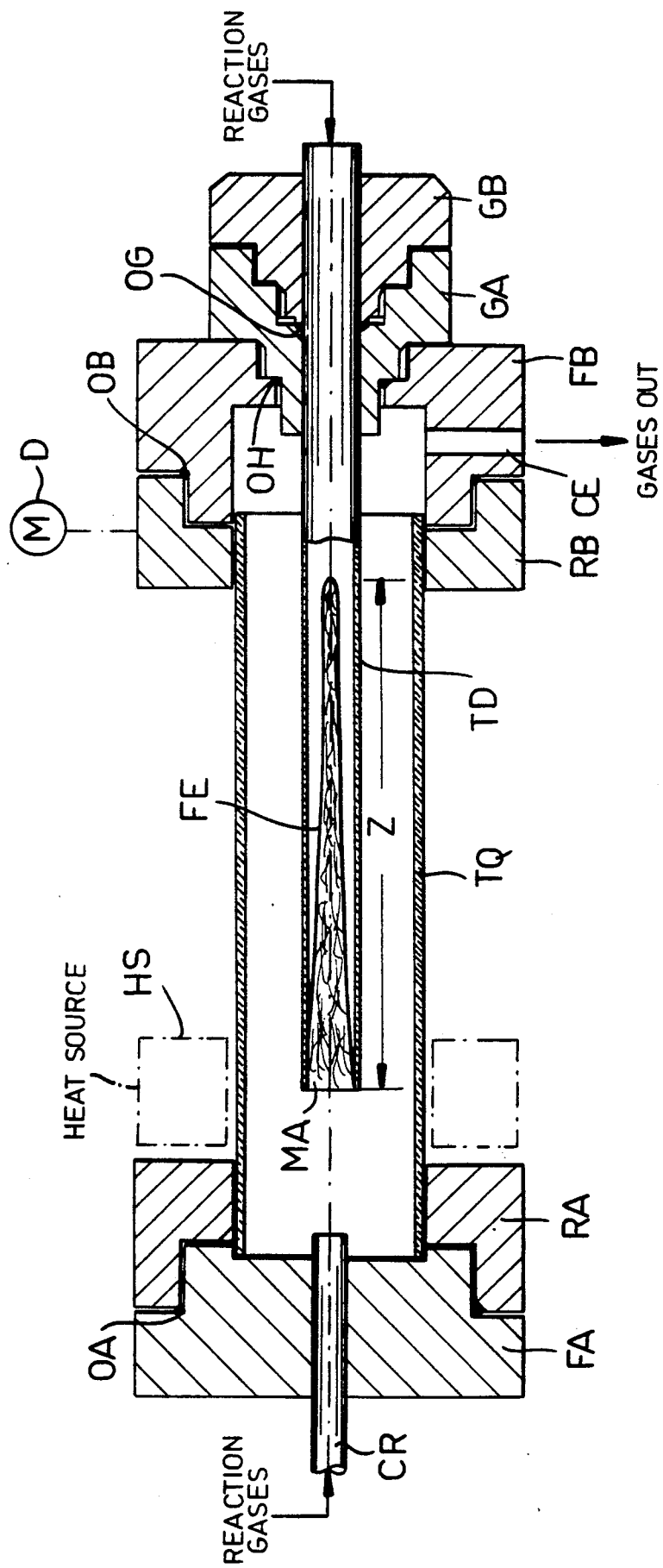

APPARATUS FOR MANUFACTURE OF A SILICA OPTICAL FIBER

CROSS-REFERENCE TO RELATED APPLICATION

This application is a continuation-in-part of copending patent application 07/363,212 filed Jun. 8, 1989 and now abandoned.

FIELD OF THE INVENTION

The present invention relates to the industrial manufacture of preform for making a fiber-optical transmission line for optical telecommunications systems and more particularly it relates to an apparatus for fabricating this optical-fiber preform.

BACKGROUND OF THE INVENTION

Germanium and phosphorus oxides, $GeO_2$ and $P_2O_5$, are nowadays the dopants most widely used to raise the refraction index of silica. Such dopants, however, have a number of disadvantages. Phosphorous oxide increases attenuation at high wavelengths due to molecular vibrations. In fact its presence gives rise to an absorption band beginning at about 1.3 $\mu$m. Germanium oxide, in addition to its high cost due to its scarcity in nature, has high volatility at MCVD process working temperatures which limits its incorporation into the silica matrix.

Owing to the latter disadvantage, a decrease in the refractive index occurs at the center of the preform core, the so-called "dip", which in the case of multimode fibers limits their transmission band while in the case of single-mode fibers gives rise to problems if particular refractive indices are required, namely in the case of fibers with optimized dispersion between 1.3 and 1.5 $\mu$m (dispersion shifted or dispersion flattened).

Alternative silica dopants, other than the above ones, could be $Al_2O_3$, $ZrO_2$, PbO, $SnO_2$, GaO, $Sb_2O_3$, etc. Alumina ($Al_2O_3$) is less volatile at the working temperature of the MCVD process and can further raise the total refractive index of fiber core, even though it is implanted in limited concentrations (in fact at a concentration of 15% by weight in the matrix of $SiO_2$) the refractive index passes from 1.4584 to 1.4630, with a 0.3% increase.

However, chemical compounds of metals, such as aluminum, are difficult to handle in the MCVD process, since no organic compounds exist which at room temperature have a high vapor pressure and hence can be easily maintained at the gaseous state up to the reaction zone where the solid is produced for fabricating the optical fiber preform.

An alternative solution could be that of starting from organometallic compounds such as described in the commonly owned Italian Patent Application 67338-A/85 corresponding to U.S. Pat. No. 4,738,873. These components have at room temperature high vapor pressure; however they are dangerous owing to their tendency to explode in the presence of oxygen.

Various processes of deposition of $Al_2O_3$—$SiO_2$—based matrices for fabricating optical fibers by the MCVD technique starting from $AlCl_3$ have been described in the literature.

According to one of these processes, described by J. R. Simpson et al in the article entitled "Optical Fibers with an $Al_2O_3$—doped Silicate Core Composition" (*Electronics Letters* 19 Jul. 1983, 261-2), $AlCl_3$ is sublimed directly at 130° C.–180° C. in a suitable vessel and is carried through a heated conduit into the reaction zone.

A second process described in British Patent Application 2,118,320 A, resides in producing $AlCl_3$ or $ZrCl_4$ in a reactor starting from Al or Zr and from $Cl_2$ and diluents. The halogen is brought into contact at high temperature with metal wires to yield a gaseous halide compound.

Such processes, however, require the lines and rotating joints be heated to keep the halide at the vapor state from the generator to the reaction zone. The heated lines are cumbersome, difficult to maintain and present serious sealing problems in order to avoid pollution in the process reaction and deposition zones.

OBJECTS OF THE INVENTION

It is therefore an object of the present invention to provide an improved system for fabricating a preform for the manufacture of silica fibers doped with oxide obtained from pressure reactants at low vapor pressure.

Another object is to provide an apparatus and method which allow metallic halides to be obtained in the vapor state in the reaction chamber without requiring heated lines and joints.

SUMMARY OF THE INVENTION

According to the invention an apparatus for fabricating silica optical fibers doped with metal oxides obtained by synthesis of low pressure vapor reactants comprises a supporting tube wherein the reaction among vapor-state reactants takes place to yield silica and dopants which are deposited on the inner surface of the supporting tube. The tube is rotated about its axis in two joints each composed of a fixed part and of a rotating part, one joint for the injection of reactants and the other for the expulsion of depleted gases. A heat source surrounds an annular zone of the supporting tube and can be axially displaced therealong. Further according to the invention, the apparatus comprises a further inner tube inside the supporting tube and extending along its axis. The inner tube has a diameter which is much smaller than that of the supporting tube and has an axial slit whose length is equal to that of the silica deposition zone and whose width increases in the direction of the flow inside the inner tube of a gas mixture arriving from the outside. A high-purity wool of wires of the metal whose oxide is desired is placed inside the inner tube. The inner tube is mounted on one of the joints by two ring nuts which are screwed onto each other to compress an O-ring, tightening on the tube. One of the ring nuts is in turn screwed onto the fixed part of a joint sealed by an O-ring. All the parts comprising the joints and ring nuts can be made of polytetrafluoroethylene or of stainless steel. The inner tube is preferably made of quartz.

BRIEF DESCRIPTION OF THE DRAWING

The above and other objects, features and advantages of the present invention will become more readily apparent from the following description in which the sole FIGURE is a cross sectional view of an apparatus for making an article which can be fabricated into silica optical fibers.

SPECIFIC DESCRIPTION

The drawing shows an outer supporting tube TQ of quartz for fabricating an optical fiber preform extending along an axis A. The reaction among vapor state reactants takes place inside the tube TQ and the solid produced, generally silica and dopant powder, deposits on the inner surface of this tube TQ. A heat source HS surrounds an annular zone of the tube TQ and can be axially displaced from right to left so as to start the reaction and cause vitrification of the material deposited along most of the tube TQ. To obtain a uniform deposition, the tube TQ is rotated by a drive illustrated schematically at D around its axis A using two rotating joints, one for injection of the reactants and the other for expulsion of gases depleted.

The rotating joint on the left consists of a rotating part RA in which the respective end of the tube TQ is fitted and of a fixed part FA in which a conduit CR is fixed for the injection of reactants. The rotating joint on the right is likewise composed of a rotating part RB in which the other end of the tube TQ is fitted and of a fixed part FB in which a radially open passage CE is formed for expelling gases partly of silica and carrying dopant powder which has not deposited on the inner surface of tube TQ. Two O-rings OA and OB guarantee hermetic seal of the two joints.

According to the invention, an inner quartz tube TD is held inside the outer supporting tube TQ coaxial therewith by two nuts GA and GB and centering means. The ring nuts GA and GB can be screwed onto each other to compress an interposed O-ring OG which seals around the tube TD so as to hold it and guarantee a hermetic seal of the reaction chamber. Ring nut GA is in turn screwed onto the fixed part FB of the right-hand joint and is sealed by an O-ring OH. This ring nut array facilitates extraction of the quartz tube TD so as to allow the necessary maintenance and cleaning operations. Of course, all the parts forming the rotating joints and the ring nuts are made of corrosion resistant materials, e.g. polytetrafluoroethylene or stainless steel. A gaseous mixture composed of a halogen, e.g. chlorine, and of helium or another inert gas is introduced into the right-hand end of the tube TD.

The diameter of tube TD is much smaller than that of tube TQ and this tube TD is provided with an axial slit FE which defines a silica-deposition zone Z and has a width increasing in the direction along which reaction gases flow inside tube TD, here from right to left. Inside the slit there is a wool MA of high-purity aluminum wire through which the gaseous mixture composed of a halogen and an inert gas is made to flow so as to obtain at the output the corresponding metallic halide in the gaseous state.

The mixture flow rates into the outer end of the tube TD and into the feed end of the tube TQ are set to maintain the temperature inside the tube TD, in correspondence with the section submitted to heating by the external heat source, less than the melting temperature of aluminum but sufficient to obtain the desired reaction between chlorine and aluminum for yielding $AlCl_3$. A suitable temperature is about 300° C. The amount of $AlCl_3$ can be adjusted by acting on the relative percents in the gaseous mixture of chlorine and inert gas.

As mentioned, the slit FE has a variable width along tube TD, namely by being of a width increasing away from the right-hand feed end of the tube TD. This helps compensate for the pressure loss of the gaseous mixture as it moves along the tube, still keeping an output speed sufficient to avoid possible clogging with doped silica powder yielded during the reaction between gaseous reactants.

Of course, the $AlCl_3$ obtained combines near the inner surface of tube TQ with oxygen to form $Al_2O_3$ which plates out on the inner surface of the tube TQ and is used in turn to raise the tube's refractive index so that it can be used as an optical-fiber preform core.

It is clear that what is described has been given only by way of non-limiting example. Variations and modifications are possible without going out of the scope of the claims. For instance, the metal wool MA can be made of Zr, Pb, Sn, Ga, Sb. The halogens can also be $I_2$ and $Br_2$. Halogen compounds $CCl_2F_2$, $CCl_4$, etc. can be used.

I claim:

1. An apparatus for fabricating silica optical fibers doped with a metal oxide, the apparatus comprising:
    an outer supporting tube extending along a longitudinal axis and having
        first and second longitudinally opposite ends, and
        an inner surface on which silica and a dopant formed by a reaction between two vapor-state reactants can be deposited over a longitudinally extending silica-deposition zone;
    heating means for heating the supporting tube and thereby causing the reaction;
    respective first and second joints engaging said first and second ends of said supporting tube, each joint having a fixed part and a rotating part, each of the rotating parts supporting a respective end of said supporting tube for rotation relative to each of the fixed parts about the axis of the supporting tube;
    means for introducing at least one of the reactants into the supporting tube through the first joint;
    means for discharging depleted gases through the second joint;
    an inner tube extending within the outer tube and of a diameter smaller than that of the outer tube, the inner tube extending through one of the joints, being axially fixed in the outer tube, and being formed between the outer-tube ends with a radially throughgoing and axially extending slit;
    a high-purity wool of wires of metal received in the inner tube along the slit; and
    means for internally supplying the inner tube with a gaseous compound reactive with the metal of the wool to form the metal oxide and forming a compound therewith constituting one of the reactants, the slit having a width which increases in a direction of flow of the gaseous compound therethrough.

2. The apparatus defined in claim 1 wherein the tubes are coaxial and the slit is coextensive with the silica-deposition zone.

3. The apparatus defined in claim 1 wherein the one joint through which the inner tube extends is the second joint.

4. The apparatus defined in claim 1, further comprising
    means for rotating the outer tube and the rotating joint parts jointly about the axis.

5. The apparatus defined in claim 1 wherein the heating means surrounds an annular zone of the supporting tube and is axially displaceable therealong.

* * * * *